(12) United States Patent
Kappen et al.

(10) Patent No.: US 11,697,221 B2
(45) Date of Patent: Jul. 11, 2023

(54) COOLING ACETYLATED WOOD ELEMENTS

(71) Applicant: Tricoya Technologies Ltd, London (GB)

(72) Inventors: Theodorus Gerardus Marinus Maria Kappen, Rosmalen (NL); Stephen John Benstead, Manchester (GB)

(73) Assignee: Tricoya Technologies Ltd, London (GB)

( * ) Notice: Subject to any disclaimer, the term of this patent is extended or adjusted under 35 U.S.C. 154(b) by 0 days.

(21) Appl. No.: 16/312,526

(22) PCT Filed: Jun. 23, 2017

(86) PCT No.: PCT/EP2017/065520
§ 371 (c)(1),
(2) Date: Dec. 21, 2018

(87) PCT Pub. No.: WO2017/220772
PCT Pub. Date: Dec. 28, 2017

(65) Prior Publication Data
US 2019/0322000 A1    Oct. 24, 2019

(30) Foreign Application Priority Data
Jun. 23, 2016  (EP) .................................. 16175947

(51) Int. Cl.
| | |
|---|---|
| B27K 3/02 | (2006.01) |
| B27K 3/34 | (2006.01) |
| C08H 8/00 | (2010.01) |
| F26B 11/04 | (2006.01) |
| F26B 21/08 | (2006.01) |

(52) U.S. Cl.
CPC .......... *B27K 3/0278* (2013.01); *B27K 3/0207* (2013.01); *B27K 3/0271* (2013.01); *B27K 3/346* (2013.01); *C08H 8/00* (2013.01); *F26B 11/04* (2013.01); *F26B 21/086* (2013.01); *F26B 2210/16* (2013.01)

(58) Field of Classification Search
None
See application file for complete search history.

(56) References Cited

U.S. PATENT DOCUMENTS

| | | | | |
|---|---|---|---|---|
| 3,567,574 A | * | 3/1971 | Braitberg ................ | D21C 9/02 162/158 |
| 5,431,868 A | * | 7/1995 | Hirano ................... | B27N 1/006 264/109 |
| 6,203,859 B1 | * | 3/2001 | Scheufler ............... | B05B 14/43 427/475 |
| 11,052,568 B2 | | 7/2021 | Rademakers et al. | |
| 11,572,444 B2 | | 2/2023 | Pol et al. | |
| 2013/0303751 A1 | * | 11/2013 | Rowell ................... | D21B 1/12 536/120 |
| 2015/0050483 A1 | * | 2/2015 | Pol ......................... | B27K 3/36 428/220 |
| 2015/0051386 A1 | * | 2/2015 | Pol ......................... | C08H 8/00 427/382 |
| 2015/0165642 A1 | | 6/2015 | Rademakers et al. | |
| 2021/0299907 A1 | | 9/2021 | Rademakers et al. | |
| 2023/0124750 A1 | | 4/2023 | Pol et al. | |

FOREIGN PATENT DOCUMENTS

| | | |
|---|---|---|
| CN | 102822282 A | 12/2012 |
| CN | 103522377 A | 1/2014 |
| CN | 104470631 A | 3/2015 |
| CN | 105128107 A | 12/2015 |
| DE | 197 50 847 C1 | 7/1999 |
| EP | 2 587 203 A1 | 5/2013 |
| GB | 223298 * | 10/1924 |
| GB | 797193 * | 6/1958 |
| JP | S59-158205 A | 9/1984 |
| JP | H03-130104 A | 6/1991 |
| JP | 1994198610 A * | 7/1994 |
| JP | H06-198610 A | 7/1994 |
| JP | 2015-511549 A | 4/2015 |
| JP | 2015-522446 A | 8/2015 |
| KR | 10-1195385 B1 | 11/2012 |
| PT | 2587203 E | 5/2013 |
| WO | WO-96/19526 A1 | 6/1996 |
| WO | WO-2011/095824 A1 | 8/2011 |
| WO | WO-2013/117641 A1 | 8/2013 |
| WO | WO-2013/139937 A2 | 9/2013 |
| WO | WO-2013/175420 A1 | 11/2013 |

(Continued)

OTHER PUBLICATIONS

Brelid, The influence of post-treatments on acetyl content for removal of chemicals after acetylation, Holz als Roh-und Werkstoff, 60, 92-95, 2002 (Year: 2002).*
Kaplan, Woodchip drying in a screw conveyor dryer, Journal of Renewable and Sustainable Energy, 4, Nov. 2012, 063110, p. 1-12 (Year: 2012).*
International Search Report from corresponding International Patent Application No. PCT/EP2017/065520, dated Sep. 11, 2017.
Examination Report issued in corresponding Australian Patent Application No. 2017281654 dated Oct. 5, 2021.

(Continued)

*Primary Examiner* — Tabatha L Penny
(74) *Attorney, Agent, or Firm* — Kusner & Jaffe

(57) ABSTRACT

A process for the production of acetylated wood elements, a cooling system and a wood acetylation plant are described. A process for the production of acetylated wood elements comprises acetylating wood elements and cooling the acetylated wood elements wherein the cooling comprises supplying liquid water to the acetylated wood elements to provide wetted wood elements and exposing the wetted wood elements to a gas flow.

15 Claims, 1 Drawing Sheet

(56) References Cited

FOREIGN PATENT DOCUMENTS

WO    WO-2015/127490 A1    9/2015

OTHER PUBLICATIONS

Notice of Allowance issued in corresponding Japanese Patent Application No. 2018-567104 dated Aug. 23, 2023.
Office Action issued in related Japanese Patent Application No. 2022-089859 dated Apr. 18, 2023 with English-language translation.

* cited by examiner

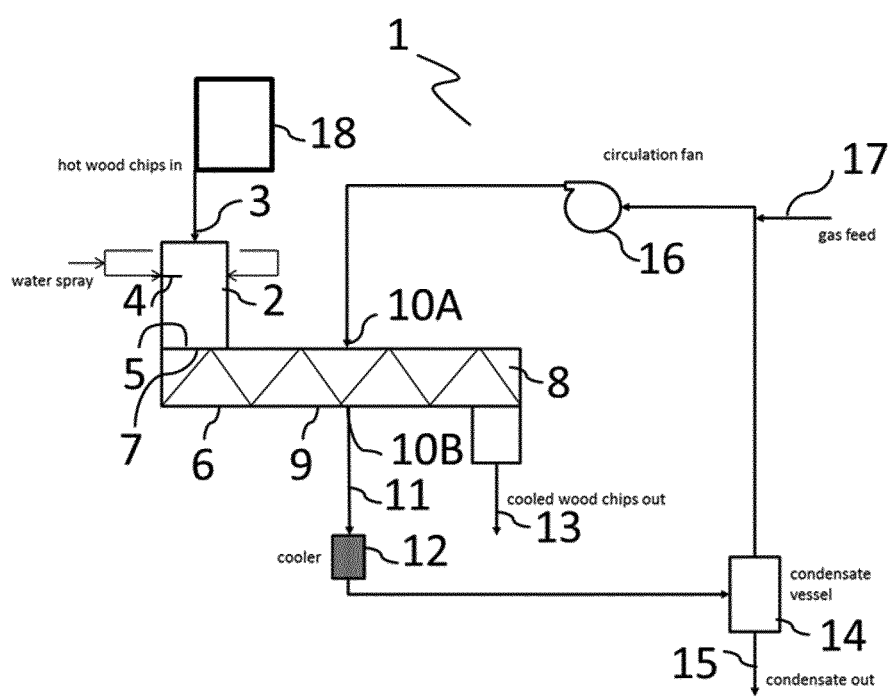

COOLING ACETYLATED WOOD ELEMENTS

FIELD OF THE INVENTION

The invention pertains to a process for the production of acetylated wood elements comprising a cooling step. In the cooling step, wood elements are cooled from a temperature preferably in the range of 120 to 180° C. to preferably less than 60° C.

BACKGROUND OF THE INVENTION

Acetylation of wood has long been recognized as a method to improve the durability of otherwise non-durable softwood species. Acetylation can be used to improve wood properties, such as hardness and dimensional stability. Background references for such processes include WO 2013/117641 and WO 2013/139937. Acetylating wood generally involves contacting wood elements with acetylation fluid comprising acetic anhydride and/or acetic acid while heating. The acetylation fluid is generally recirculated.

Acetylation of wood provides hot acetylated wood elements with a temperature of, typically, at least 120° C. or at least 150° C., often between 160 and 180° C. The acetylated wood elements are hence too hot for storage and further handling. Storage of acetylated wood elements with such temperatures involves a risk of smoldering (flameless combustion), even while the wood elements are slowly cooling against ambient. Cooling of the acetylated wood elements is therefore necessary, in particular if the acetylated wood elements are not immediately further processed.

However, current cooling methods are unsatisfactory for (acetylated) wood elements. The low heat transfer coefficient of wood elements makes cooling challenging. In particular for gas cooling and cooling with indirect heat exchange, the low heat transfer coefficient causes problems. Cooling by flowing cooling gas over the acetylated wood elements is not efficient enough and would require very high gas flows and long residence times of the wood elements. Indirect cooling does not provide for homogenous and fast cooling in view of the very poor heat transfer from cooled equipment to wood elements. A further method of submerging acetylated wood elements in a cooling bath is not attractive because this would result in wet acetylated wood elements. The cooled wood elements may even be dripping. Moreover, there is a risk of leaching of residual acetylation fluid from the acetylated wood elements into the cooling liquid.

Accordingly, there is a need for better cooling methods for in particular acetylated wood elements and processes incorporating such methods. Desirably, these methods are fast and efficient and do not involve the above-mentioned disadvantages of prior art methods.

JP H06-198610 describes a process wherein wooden fiber obtained by shredding wood is acetylated in a liquid phase, then this acetylated wooden fiber is accumulated and formed in one piece.

SUMMARY OF THE INVENTION

In order to better address one or more of the foregoing desires, the invention provides, in an aspect, a process for the production of acetylated wood elements, comprising acetylating wood elements and cooling the acetylated wood elements wherein the cooling comprises supplying liquid water to the acetylated wood elements to provide wetted wood elements and exposing the wetted wood elements to a gas flow.

In a further aspect, the invention relates to a cooling system comprising a water spray chamber, an evaporation section downstream of said water spray chamber, and a gas recirculation loop, wherein said water spray chamber comprises an inlet for wood elements, a liquid distributor for spraying water, and an outlet for wood elements, and wherein the evaporation section comprises an inlet and an outlet for wood elements, a conveyor for continuously transporting wood elements from said inlet to said outlet, and an inlet conduit having at least one opening for introducing gas into said evaporation section and an outlet conduit having at least one opening for withdrawing gas from into said evaporation section, wherein said conduits are coupled to said gas recirculation loop and wherein said openings of said conduits are different from said inlet and outlet for wood elements.

The invention also relates to a wood acetylation plant.

BRIEF DESCRIPTION OF THE DRAWINGS

FIG. 1 shows a process scheme for a non-limiting illustrative embodiment of a process for the cooling of wood elements according to the invention.

DETAILED DESCRIPTION

The invention generally relates to the production of acetylated wood elements and to the cooling of acetylated wood elements. The invention is in an aspect based on the judicious insight that a combination of wetting of hot acetylated wood elements with a liquid and evaporating the liquid from the wetted wood elements provides efficient cooling of acetylated wood elements. Accordingly, the process comprises supplying a liquid, preferably water, to the acetylated wood elements to provide wetted wood elements and exposing the wetted wood elements to a gas flow. The exposure to the gas flow causes evaporation of the aqueous liquid which is in contact with the wood elements, resulting in a temperature decrease of the wood elements. In the present invention, the wetting and exposing are used to provide for evaporative cooling of hot acetylated wood elements. This may be contrasted to for example air conditioning methods using evaporative cooling to cool air.

The process comprises acetylating wood elements. The step of acetylating wood elements generally involves contacting wood elements with acetylation fluid comprising acetic anhydride and/or acetic acid. During the contacting, the temperature of the wood elements increases to a temperature in the range of 120 to 180° C., more preferably to a final temperature in the range of 150 to 180° C.

The acetylation step is preferably a continuous process step. The process can be a batch or continuous process or comprise a combination of batch and continuous process steps. Preferably, the cooling step is a continuous process step. More preferably, the exposure step is a continuous process step.

Preferably, the acetylation comprises removal of excess acetylation liquid from the acetylated wood elements, for example under reduced pressure. Preferably, the process comprises a finishing step between the acetylation and the cooling step. The finishing step generally has the purpose of reducing the content of non-reacted acetic anhydride and formed acetic acid of the wood elements. A finishing step preferably comprises exposing acetylated wood elements to reduced pressure and/or high temperatures, such as about 130° C. or higher. Frequently, the wood elements as obtained from a finishing step have a temperature of more than 120° C., such as more than 150° C.

Preferably, the acetylated and optionally finished wood elements have a temperature of 120° C. or more, such as 150° C. or more, and preferably an acetyl content of more than 15 wt. % or more than 17 wt. % or more than 20% or more than 21 wt. %; preferably at its geometrical centre. Preferably the acetylated wood elements also have a residual acid content of less than 1 wt. %, or less than 0.9 wt. % or less than 0.5 wt. %, on dry basis, for example obtained by a finishing step. Preferably, the cooled wood elements have such acetyl content and/or residual acid content.

The acetyl content of the wood can be determined as follows. Samples are ground to wood particles. From these samples residual trace amounts of acetic acid and/or acetic anhydride are removed by washing with water and subsequent drying at 103±2° C. for between 14 to 24 hrs. After weighing these dried samples, the acetyl groups are released from the wood in the form of acetate ions by saponification with sodium hydroxide solution at elevated temperature, typically 90° C. This saponification reaction runs for 4 hrs, with stirring every 15 minutes. The acetate ions are quantified by means of high-pressure liquid chromatography (HPLC), after calibrating this HPLC with standard acetate solutions and using sodium butyrate as internal reference.

The residual acetic acid (RA) content is a measure of the residual, non-bound acetic acid contained in the wood (including acetic acid formed by hydrolysis of residual, non-bound acetic anhydride). Acetic acid may also originate from the wood itself, therefore the RA measures both the original acetic acid and the acetic acid left from the acetylation reaction. For determining the residual acid content (RA) a well-defined amount of 3-5 g of sample material is shaken in demineralised water for 1 hr. After this extraction step the sample is separated from the water fraction by filtration. Subsequently this water fraction is titrated with a known sodium hydroxide (NaOH) solution, using phenolphthaleine as an indicator, from which the residual acid concentration of the sample can be calculated.

The process comprises cooling the acetylated wood elements. Preferably, the wood elements are cooled to a temperature below 100° C. or below 80° C., more preferably below 60° C. or below 40° C., such as to ambient temperature, generally above 5° C. Preferably, the temperature of the wood elements decreases by at least 30° C. or at least 50° C., more preferably by at least 80° C. during said cooling, more in particular during the exposure to the gas flow. Preferably, the wood elements at the outlet of an evaporation section have a temperature below 100° C. or below 80° C., more preferably below 60° C. or below 40° C., for example ambient temperature. In case an atmosphere different from ambient is maintained in an evaporation section, e.g. an inert atmosphere, then an outlet of an evaporation section is optionally characterized by transfer of wood elements to ambient atmosphere, and/or to an atmosphere different from the gas flow. Preferably, this cooling is achieved in less than 30 minutes or less than 15 minutes.

The cooled wood elements can for instance have a water content of less than 35 wt. %, for example in the range of 1 to 8 wt. % or 5 to 10 wt. %, in particular at the outlet of an evaporation section.

The invention generally relates to producing acetylated wood elements. In particular wood chips, strands and particles are challenging to cool compared to e.g. wood fibres in view of the lower specific surface area ($m^2$ surface area/kg wood).

The wood elements for example comprise or consist of one or more selected from the group consisting of wood chips, wood strands, and wood particles. The process and system of the invention are for example used for the acetylation of durable and non-durable hardwoods, as well as durable and nondurable softwoods. The wood elements preferably belong to non-durable wood species such as non-durable hardwoods, or soft woods, for example, coniferous trees, typically spruce, pine or fir. Preferred types of wood are spruce, sitka spruce, maritime pine, scots pine, radiata pine, *eucalyptus*, red alder, European alder, beech and birch.

Typical dimensions of some types of wood elements are given in the following table 1. Preferred are wood chips, strands, and particles as defined in table 1 and optionally slivers. Preferably, the wood elements consist of one of the types of wood elements as defined in table 1, to achieve more homogenous cooling. In some embodiments, wood particles have a width and/or thickness of 1.0 to 5.0 mm. Preferably, the wood elements have at least two dimensions (in orthogonal directions) of at least 0.15 mm.

TABLE 1

Typical dimensions of types of wood elements

| Type of wood element | length (mm) from | to | width (mm) from | to | thickness (mm) from | to |
|---|---|---|---|---|---|---|
| Chips | 5 | 75 | 5 | 50 | 1.5 | 25 |
| Strands | 20 | 120 | 5 | 40 | 0.25 | 1.5 |
| Splinters (slivers) | 5 | 75 | 0.15 | 0.5 | 0.15 | 0.5 |
| Particles | 1.5 | 20 | 0.15 | 5 | 0.15 | 5 |
| Fibre bundles | 1.5 | 25 | 0.15 | 0.5 | 0.15 | 0.5 |
| Fibres | 1 | 5 | 0.05 | 0.1 | 0.05 | 0.1 |

The cooling comprises supplying liquid water to the wood elements to provide wetted wood elements. The water is optionally supplied as liquid stream comprising other components, or as liquid stream essentially consisting of water, such as for more than 99 wt. %.

Preferably, liquid water is provided on the surface of the wood elements and preferably the wood elements are brought in contact with liquid water. Preferably, the process comprises introducing wood elements into a wetting chamber and introducing liquid water into the wetting chamber. In some embodiments, the wetting does not involve condensation in the wetting chamber. In some optional embodiments, the process for example does not comprise introducing steam into the wetting chamber in contact with wood elements. Preferably, the amount of liquid water supplied to the wood elements is in the range of 10 to 500 g water, more preferably 50 to 400 g water, or 100-500 g water, even more preferably 100 to 250 g water, such as 100 to 150 g water per 1 kg dry wood elements. Preferably, the wood elements are contacted with 10 to 500 g water per 1 kg dry wood elements, more preferably 50 to 400 g water, even more preferably 100 to 250 g water, such as 100 to 150 g water per 1 kg dry wood elements. This provides for better cooling. Preferably, a stream comprising wood elements at an outlet of the wetting chamber comprises such amounts of water per kg dry wood, and still comprises such amounts at the inlet of the evaporation section. Preferably, the gas flow is contacted with a stream comprising wood elements having such amounts of water.

The temperature of the liquid water as introduced into the wetting chamber is for example in the range of 5 to 95° C., such as between 10 and 50° C. The wetting is preferably performed at ambient pressure such as between 1 and 5 bara. Preferably, the wetted acetylated wood elements have a temperature of 100° C. or more, or 120° C. or more, such as 150° C. or more.

Preferably, wetted acetylated wood elements are maintained under low oxygen conditions, such as under inert gas and/or vacuum, from the acetylation step to inlet of the wetting chamber. Herein, low oxygen conditions include an oxygen partial pressure of for example less than 5 kPa or less than 2 kPa. This advantageously allows for preventing charring of the wood elements. Accordingly, the wetted acetylated wood elements are hot, e.g. 120° C. or more, such as 150° C. or more, from the acetylation step to inlet of the wetting chamber and also at the inlet of the wetting chamber.

The hot acetylated wood elements may be transported through the wetting chamber for instance by gravity flow or using a conveyor.

Preferably, a part or all of the water is supplied to the wood elements by spraying, preferably to provide homogenously wetted wood elements. Spraying also provides for limited sensible heat exchange during wetting of wood elements. Preferably, the wood elements are wetted in a chamber comprising at least one liquid distributor for spraying water. Preferably, the water is sprayed through nozzles. Optionally, water is sprayed as droplets having a volume mean diameter of at least 100 µm, or at least 250 µm, such as in the range of 250 to 550 µm. In the preferred process, spraying is used for distributing and providing liquid water over the surfaces of the hot acetylated wood elements and in the voids between hot acetylated wood elements, rather than to promote evaporation of droplets. Spraying may include showering water, for example with a moving head. Optionally, less than 10 wt. % of the introduced liquid water evaporates in the wetting chamber, optionally without contact with acetylated wood elements.

The cooling further comprises an evaporation step comprising exposing the wetted wood elements to a gaseous medium, in particular to a gas flow, usually in an evaporation section. Preferably, the acetylated wetted wood elements at the beginning of such exposure to the gas flow and/or at the inlet of such an evaporation section have a temperature of 120° C. or more, such as 150° C. or more. As a result of this exposure, water evaporates from the wood elements, and the required heat of vaporisation is withdrawn from the wood elements, thereby decreasing the temperature of the wood elements.

Preferably, the wetted wood elements are exposed to a gas flow such that water vapour is continuously removed from the wood elements. Preferably, the wood elements are exposed to a gaseous flow having a relative humidity of less than 50% or less than 20% or less than 10% at the temperature of the wetted wood elements. More in particular, this refers to water content of the gas flow at an inlet of the evaporation section, calculated as relative humidity based on the temperature of the wood elements at the inlet for wood elements of the evaporation section. The gas flow at the inlet generally has a temperature at least 10° C. or at least 20° C. or at least 50° C. or at least 100° C. lower than the wood elements introduced into the evaporation section.

The evaporation section is preferably operated at a pressure in the range of 0.5 to 5.0 bara, such as between 1 and 2 bara, preferably at ambient pressure.

Preferably, the wetted wood elements are conveyed through an evaporation section, preferably in a continuous manner. The wetted wood elements may also be exposed to an air flow while not moving. The residence time of the wood elements in the evaporation section is for example less than 30 minutes or less than 15 minutes or less than 10 minutes, such as in the range of 5 to 10 minutes.

Preferably, the gas flow has a lower oxygen concentration than ambient atmosphere, so as to not oxidise the hot wetted acetylated wood elements. The hot wetted acetylated wood elements are e.g. 120° C. or more, or 150° C. or more. Hence, generally, the gas flow (irrespective of oxygen content) is contacted with hot wetted acetylated wood elements of e.g. 120° C. or more, or 150° C. or more. Preferably, the gas flow comprises, at the inlet into the evaporation section, less than 10% oxygen by volume, or less than 5% or less than 2% or less than 1% oxygen by volume. More preferably, the gas flow comprises at least 90% or at least 99% by volume of inert gas such as nitrogen, carbon dioxide and/or flue gas. Nitrogen is preferred. Also possible is using oxygen depleted and/or nitrogen enriched air, compared to ambient. In view of these preferred compositions of the gas flow, the gas is preferably recirculated.

Preferably, the evaporation step comprises providing a gas flow over the wood elements, preferably of inert gas, in an evaporation section wherein the wood elements are conveyed in a continuous manner. The conveying direction defines the length of the evaporation section. Hence, a gas flow having a flow direction is introduced in the evaporation section, in particular into the space through which the wood elements are conveyed. The gas flow is further vented from the evaporation section. The gas flow generally has a direction essentially co-current, counter-current or perpendicular (cross-current flow) to the conveying direction of the wood elements. Cross-current flow is preferred. The gas flow direction is defined by the one or more inlets and one or more outlets for gas of the evaporation section, which may be separate from the inlet and outlet for wood elements.

In some embodiments, the wood elements are horizontally conveyed in the evaporation section. The gas flow is for example horizontally from side to side, or from top to bottom, or from bottom to top of (and inside) the evaporation section. Preferably, said evaporation section comprises a conveyor system comprising the inlet and outlet for wood elements, a conveyor and a shell, wherein the shell provides a space through which wood elements are conveyed by the conveyor (such as a belt, chain or screw). The shell is configured for maintaining an atmosphere in the space different from ambient. Preferably, the evaporation section comprises inlets for the gas flow into the space and outlets for venting or withdrawing gas comprising water vapour from the space. Preferably, the openings of these inlets and outlets for gas flow are different in size to the inlet and outlet for wood elements. Preferably, they are positioned between the inlet and outlet for wood elements. Optionally, these openings are provided through the shell. Optionally, these openings are provided in gas conduits provided in the evaporation section and generally extending in said space and connected to an opening in said shell, or extending to or through an inlet or outlet for wood elements. Preferably, the openings for gas have a smaller size than the inlet and outlet for wood elements, and preferably have a size smaller than the size of the wood elements. Preferably, the inlet gas conduit comprises a manifold for distributing the gas flow over at least part of the length of the evaporation section. Preferably the openings and the inlet and outlet for wood elements are arranged for cross-flow.

A screw conveyor is preferred, as this may provide for homogenisation of the wood elements, in addition to transport. The screw action may provide for increased homogeneity of the temperature of the wood elements. This may advantageously allow for a reduced residence time. Moreover, the screwing movement may allow for mixing of wood elements and water, such as by shuffling and/or tumbling. The screw movement may also allow for redistribution of water over the wood elements, in particular from slowly drying wood elements to quickly drying wood elements. The screwing movement may also provide for optimising exposure of the wood element surfaces to the drying atmosphere. A horizontal screw conveyor is preferred. A filling level of for example at least 70% or at least 80% volumetric fill can be used to give homogeneous flow and prevent shortcutting of gas flow through low fill sections. Belt conveyors, tubular belt conveyors, bucket conveyors, and chain conveyors can also be used.

The process preferably comprises withdrawing gas comprising inert gas, preferably saturated or nearly saturated with water vapour, from an evaporation section. The gas is preferably recirculated using a recirculation loop coupled to the evaporation section. In the recirculation loop, the gas is preferably cooled, water vapour is condensed from the gas, the condensate is preferably removed from the recirculating gas, and the gas is recirculated back to the section using e.g. a fan. A purge of gas may be withdrawn and/or gas may be added in order to control pressure and oxygen level. By condensation of water vapour in the recirculation loop and removal of condensate, the relative humidity and temperature of the recirculated gas stream are at least partly controlled and the drying capacity of the gas flow is maintained. The amount of condensate also indicates the effective withdrawal of the latent heat of vaporisation from the wood elements. Accordingly, preferably, at least 3 wt. % or at least 5 wt. % water is condensed in the recirculation loop based on weight of the wood elements, e.g. per minute, based on kg condensate formed and preferably withdrawn per kg wood on dry basis, e.g. per kg wood elements passing through the outlet of the evaporation section.

Optionally, the gas flow is passed through the evaporation section multiple times before being subjected to condensation, for example through separate zones arranged in series in the evaporation section. Optionally, cross-current flow within a zone is combined with overall counter-current flow through multiple zones.

The cooling in the recirculation loop preferably comprises indirect heat exchange against a cooling fluid. Optionally, the heat of condensation released during the condensation is recovered e.g. by heat exchange against a fluid stream to be heated. Furthermore, the condensate is separated from the gas and is optionally recycled to the wetting step, or for example further processed and disposed of. The recirculation loop preferably comprises a fan for reintroducing the dried gas as gas flow into the evaporation section. Preferably, the temperature decrease of the gas in the recirculation loop is at least 5° C. or at least 10° C. Preferably, the water vapour content of the reintroduced gas flow is less than 50% of the water vapour content as the gas flow withdrawn from the evaporation section.

Optionally, the process further comprises storing and/or handling the cooled wood elements. The described cooling may also be used for cooling wood elements that are not acetylated.

Yet a further aspect of the invention relates to a cooling system (1). A non-limiting embodiment is shown in FIG. 1. The cooling system (1) comprises a water spray chamber (2), an evaporation section (6) downstream, with respect to wood elements, of said water spray chamber (2), and a gas recirculation loop (11). The water spray chamber (2) comprises an inlet (3) and an outlet (5) for wood elements (3), and preferably a liquid distributor (4) for spraying water. The downstream evaporation section (6) comprises an inlet (7) and an outlet (13) for wood elements, a shell (9), and preferably a conveyor (8) for continuously transporting wood elements through said shell (9) from said inlet (7) to said outlet (13). Said outlet (5) is connected to said inlet (7). Preferably, the evaporation section (6) is provided with openings (10) for introducing gas into evaporation section (6) and withdrawing gas from evaporation section (6). These openings are coupled to said gas recirculation loop (11), e.g. in fluid communication. The openings (10) are different and spaced apart from the inlet (7) and outlet (13) for wood elements. Preferably, the evaporation section comprises an inlet conduit (10a) and an outlet conduit (10b) for gas comprising such openings (10). The conduits are coupled to the gas recirculation loop (11). The conduits (10a, 10b) are provided preferably in said shell, e.g. at least partly through said shell or at the inside wall of said shell. The inlet conduit (10a) allows for distributing gas over and into at least part of the space defined by the shell (9). The outlet conduit (10b) allows for collecting gas, e.g. over the length of the shell, and withdrawing gas from the shell (9) into the recirculation loop (11). Both conduits preferably have a wall distinct from the shell, wherein said openings (10) are provided in said wall.

Preferably, the evaporation section (6) is constructed in a screw conveyor, wherein the conveyor (8) is at least one screw. Preferably openings (10) are arranged in said screw conveyor for flow of gas in cross-flow with the conveying direction of said screw.

Preferably, said recirculation loop (11) comprises a cooler (12) and a condensation vessel (14), which may also be combined with each other, and has an outlet for condensate (15). Preferably the recirculation loop further comprises a recirculation fan (16) for reintroducing the gas flow into the evaporation section. The recirculation loop may further comprise an inlet for gas (17) and optionally a gas purge outlet (not shown). The gas recirculation loop is coupled in fluid communication with said evaporation section, in particular with the space inside said shell through which wood elements are conveyed.

Preferably, the gas inlet conduit (10a) is arranged radially opposed to the gas outlet conduit (10b). Herein, the radial direction is perpendicular to the length of the evaporation section. Optionally, a gas conduit extends parallel to the conveying direction over at least part, preferably more than half, of the length of the evaporation section, wherein the gas conduit is provided with openings, preferably distributed over at least part of its length and more preferably over at least half of the length of the evaporation section.

For example a manifold can be used as a gas inlet conduit. This advantageously provides for introducing the gas with a good distribution over the conveying direction. Optionally, a wedge-wire screen is used as a gas outlet conduit.

The shell (9) and/or outlet (13) are preferably configured for maintaining an atmosphere different from ambient atmosphere in the evaporation section, in particular for maintaining a lower oxygen partial pressure. Further preferences for the cooling system (1) are as described in connection with the process. In operation, wood elements are acetylated in section (18) and wetted by spraying water on it in chamber (2). The wetted wood elements are exposed to a gas flow being while conveyed through the evaporation section (6) such that water evaporates. Water vapour condenses in condensation vessel (14). Cooled wood elements such as wood chips are obtained at the outlet (13).

An evaporation section optionally comprises one or more evaporation units, or optionally comprises one or more zones provided in a unit or shell which also comprises other zones, such as a wetting zone. The evaporation section optionally comprises one or more evaporation zones which for example have different temperature, pressure, and/or composition of gas flow. The cooling system can be used in a method for producing acetylated wood elements as described. The cooling system can be used in a method of cooling wood elements that are acetylated or are not acetylated.

In yet a further aspect, the invention also relates to a wood acetylation plant comprising a wood acetylation section (18) and downstream thereof said cooling system (1), wherein the outlet of said wood acetylation section is coupled for transport of wood elements to said inlet (3) for wood elements of said water spray chamber. Preferably, the wood acetylation plant is configured for transport of wood elements from said acetylation section to said cooling system without exposure of the wood elements to ambient air and/or under controlled atmosphere.

The wood acetylation section comprises a reaction unit, such as a chamber or vessel or conveying unit. Preferably, said wood acetylation section further comprises a heater for heating acetylation fluid. The wood acetylation section preferably further comprises a part downstream of said reaction chamber configured for removing acetylation fluid. Preferably, said reaction chamber is designed so as to provide for continuous transport of wood elements from the inlet to an outlet thereof. Optionally, said reaction unit comprises a vertically arranged plug flow reactor. Optionally, said reaction unit comprises a screw conveyor, preferably substantially horizontally arranged (including oblique), for contacting wood elements with acetylation fluid. The plant may comprise an impregnation unit upstream of the acetylation section configured for vacuum impregnation of wood elements with acetylation fluid.

For the purpose of clarity and a concise description features are described herein as part of the same or separate embodiments, however, it will be appreciated that the scope of the invention may include embodiments having combinations of all or some of the features described. It will be clear to the skilled person that the invention is not limited to any embodiment herein described and that modifications are possible. The preferred and exemplified features of the processes and the apparatus and system can be combined with each other. The process of the invention optionally comprises a wood acetylation process or method. The term "comprising" is used to allow for the presence of further elements and/or steps than those recited; and encompasses preferred embodiments wherein the referenced item substantially or essentially consists, or consist, of the recited elements and/or steps. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention without departing from its scope. The use of expressions like "preferably" is not intended to limit the invention.

Having described the invention, the following is claimed:

1. A process for the production of acetylated wood elements, comprising:
   acetylating wood elements selected from the group consisting of wood chips, wood strands, and wood particles; and
   cooling the acetylated wood elements, the cooling comprising:
     spraying the acetylated wood elements with liquid water to provide wetted wood elements having a temperature of at least 120° C. and containing 10 to 500 g water per 1 kg dry wood elements; and
     exposing the wetted wood elements having the temperature of at least 120° C. and containing 10 to 500 g water per 1 kg: dry wood elements to a gas flow having a flow direction to contact the gas flow with the wetted wood elements,
   wherein the temperature of the wetted wood elements decreases by at least 30° C. during said exposing of the wetted wood elements to the gas flow.

2. The process according to claim 1, wherein the wetted wood elements contain 100 to 500 g water per 1 kg dry wood elements after the spraying of the acetylated wood elements with the liquid water.

3. The process according to claim 1, wherein the wood elements have at least two dimensions of at least 0.15 mm.

4. The process according to claim 1, wherein the wood elements consist of the wood chips.

5. The process according to claim 1, wherein said gas flow comprises less than 5% oxygen by volume.

6. The process according to claim 1, further comprising:
   conveying the wetted wood elements through an evaporation section during said exposing to the gas flow.

7. The process according to claim 6, wherein the acetylated wood elements are sprayed such that the provided wetted wood elements are homogeneous wetted, and
   wherein the gas flow is provided over the homogeneously wetted wood elements in said evaporation section,
   the gas flow comprising less than 5% oxygen by volume.

8. The process according to claim 7, wherein said gas flow is provided in cross-flow with the wetted wood elements.

9. The process according to claim 8, wherein said evaporation section comprises a screw section having a screw, and
   wherein movement of the screw provides for transport and homogenization of the wetted wood elements.

10. The process according to claim 7, wherein the acetylated wood elements have a temperature of 150° C. or, an acetyl content of more than 20%, and a residual acid content of less than 0.5 wt. %, and
    wherein the liquid water used in the spraying of the acetylated wood elements is sprayed in an amount of 10-500 g water per 1 kg dry wood elements to homogeneously wet the acetylated wood elements.

11. The process according to claim 6, further comprising:
    recirculating gas of said gas flow through a recirculation loop coupled to said evaporation section,
    wherein, in said recirculation loop, water vapour is condensed, and condensate is withdrawn from the recirculation loop.

12. The process according to claim 11, wherein at least 3 wt. % water is condensed in the recirculation loop based on dry weight of the wood elements.

13. The process according to claim 1, further comprising storing and/or handling the cooled wood elements.

14. The process according to claim 1, wherein the wetted wood elements are exposed to the gas flow for a duration between 5 minutes and 30 minutes.

15. The process according to claim 1, wherein the acetylating of the wood elements is performed in a wood acetylation section,
- wherein the acetylated wood elements are transported from the wood acetylation section to a water spray chamber of a cooling system,
- wherein the cooling of the acetylated wood elements occurs in the cooling system after the acetylated wood elements are transported to the cooling system,
- wherein the gas flow is directed into an evaporation section of the cooling system through which the wetted wood elements are conveyed to expose the wetted wood elements to the gas flow having the flow direction, and
- wherein the flow direction is a cross-current direction with respect to a direction in which the wetted wood elements are conveyed through the evaporation section.

\* \* \* \* \*